(12) United States Patent
Vangeel et al.

(10) Patent No.: US 9,910,153 B2
(45) Date of Patent: Mar. 6, 2018

(54) COMMUNICATION CHANNEL THROUGH PRESENCE DETECTION

(71) Applicant: PHILIPS LIGHTING HOLDING B.V., Eindhoven (NL)

(72) Inventors: Jurgen Mario Vangeel, Beerse (BE); Wijnand Johannes Rietman, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/424,049

(22) PCT Filed: Aug. 27, 2013

(86) PCT No.: PCT/IB2013/056903
§ 371 (c)(1),
(2) Date: Feb. 26, 2015

(87) PCT Pub. No.: WO2014/033618
PCT Pub. Date: Mar. 6, 2014

(65) Prior Publication Data
US 2015/0301173 A1    Oct. 22, 2015

Related U.S. Application Data

(60) Provisional application No. 61/693,841, filed on Aug. 28, 2012.

(51) Int. Cl.
*H05B 37/02* (2006.01)
*G01S 15/04* (2006.01)

(52) U.S. Cl.
CPC .......... *G01S 15/04* (2013.01); *H05B 37/0227* (2013.01); *Y02B 20/44* (2013.01)

(58) Field of Classification Search
CPC .... H05B 37/00; H05B 37/02; H05B 37/0227; H05B 37/0245; H05B 37/0272
(Continued)

(56) References Cited

U.S. PATENT DOCUMENTS 6,307,952 B1 * 10/2001 Dietz .................... G01S 15/586
382/107
2001/0012238 A1    8/2001 Iwasaki et al.
(Continued)

FOREIGN PATENT DOCUMENTS

CN     102014550 A    4/2011
JP     H06119978 A    4/1994
(Continued)

*Primary Examiner* — Tung X Le
(74) *Attorney, Agent, or Firm* — Akarsh P. Belagodu

(57) ABSTRACT

According to a first aspect of the invention, a method (6) of operating a presence detector (310) is provided, comprising the steps of transmitting (603) a first wave signal in a first time slot (810) for detecting presence of an object, based on an echo of the first wave signal, and if presence of an object is detected, changing (606) a property parameter of the first wave signal. According to a second aspect of the invention, a method (7) of operating a presence detector (320) is provided, comprising the steps of monitoring (701), in a first time slot (810), a property parameter of a first wave signal transmitted from another presence detector (310), and transmitting (704) a control signal upon detection of a change in the monitored property parameter of the first wave signal. The invention is advantageous in that presence information is communicated between different presence detectors without any need for additional communication systems, thereby reducing technical complexity and costs.

12 Claims, 3 Drawing Sheets

(58) Field of Classification Search
USPC ........ 315/149, 153, 158, 291, 307, 312, 360
See application file for complete search history.

(56) References Cited

U.S. PATENT DOCUMENTS

| | | | | |
|---|---|---|---|---|
| 2006/0044152 A1* | 3/2006 | Wang | ................... | H04L 12/2803 340/2.24 |
| 2008/0298330 A1* | 12/2008 | Leitch | ..................... | H04W 4/02 370/338 |
| 2012/0112666 A1* | 5/2012 | Bennette | ............ | H05B 37/0218 315/307 |
| 2012/0206051 A1* | 8/2012 | Nieuwlands | ....... | H05B 37/0227 315/153 |
| 2012/0306384 A1* | 12/2012 | Chen | .................. | H05B 33/0854 315/159 |
| 2015/0123546 A1* | 5/2015 | Pandharipande | .. | H05B 37/0227 315/153 |

FOREIGN PATENT DOCUMENTS

| | | |
|---|---|---|
| JP | 2011124187 A | 6/2011 |
| WO | 2010054741 A1 | 5/2010 |

\* cited by examiner

COMMUNICATION CHANNEL THROUGH PRESENCE DETECTION

CROSS-REFERENCE TO PRIOR APPLICATIONS

This application is the U.S. National Phase application under 35 U.S.C. §371 of International Application No. PCT/IB13/056903, filed on Aug. 27, 2013, which claims the benefit of U.S. Provisional Patent Application No. 61/693,841, filed on Aug. 28, 2012. These applications are hereby incorporated by reference herein.

FIELD OF THE INVENTION

The present invention generally relates to the field of presence detectors configured to transmit wave signals and detect presence of an object, based on echoes of the wave signals. In particular, the present invention relates to communication between such presence detectors.

BACKGROUND OF THE INVENTION

Ultrasound presence detectors send out a burst (or continuous) wave of ultrasound and the echoes received at the detector from the environment are used to determine whether an object (e.g. a person) is present in a space (e.g. a room). Different methods can be used for such presence detection, such as Doppler shift measurements, time-of-flight measurements and moving target indicator (MTI) processing. Presence information obtained by presence detectors can be used in a lighting system for controlling one or more lighting devices.

When using presence detectors in a large open space (e.g. an open office), several detectors are needed to cover the space. For reducing the risk of interference between the detectors, time division multiplexing techniques may be used. With time division multiplexing techniques, each detector has a unique time slot, in which the detector performs the presence detection.

Communication infrastructures (or protocols), such as I2C, UART (Universal Asynchronous Receiver/Transmitter), DALI (Digital Addressable Lighting Interface) and ZigBee, may be used in lighting systems for communicating data between different parts of the lighting system.

SUMMARY OF THE INVENTION

It is an object of the present invention to provide a presence detector which is able to communicate presence information and a presence detector which is able to receive presence information from another presence detector. It is also an object of the present invention to provide methods of operating such presence detectors.

These and other objects are achieved by presence detectors and methods of operating presence detectors as defined by the independent claims. Preferred embodiments are defined by the dependent claims.

According to a first aspect of the present invention, a method of operating a presence detector is provided. The method comprises the steps of transmitting a first wave signal in a first time slot for detecting presence of an object, based on an echo of the first wave signal, and if presence of an object is detected, changing a property parameter of the first wave signal.

According to a second aspect of the present invention, a method of operating a presence detector is provided. The method comprises the steps of monitoring, in a first time slot, a property parameter of a first wave signal transmitted from another presence detector, and transmitting a control signal upon detection of a change in the monitored property parameter of the first wave signal.

According to a third aspect of the present invention, a presence detector is provided. The presence detector comprises a presence detection unit configured to transmit a first wave signal in a first time slot for detecting presence of an object, based on an echo of the first wave signal, and, if presence of an object is detected, change a property parameter of the first wave signal.

According to a fourth aspect of the present invention, a presence detector is provided. The presence detector comprises a monitoring unit configured to monitor, in a first time slot, a property parameter of a first wave signal transmitted from another presence detector, and transmit a control signal upon detection of a change in the monitored property parameter of the first wave signal.

For the sake of simplicity, the presence detector according to the third aspect of the invention will, in the present specification, hereinafter be referred to as the first presence detector and the presence detector according to the fourth aspect of the invention as the second presence detector. Accordingly, the method according to the first aspect of the invention will be referred to as the method of operating the first presence detector and the method according to the second aspect of the invention will be referred to as the method of operating the second presence detector. However, the terms "first" and "second" shall not be construed as limiting in any way.

It can be useful to communicate presence information between neighboring regions or subareas in a space, such that lighting devices located in regions or subareas in the vicinity of a particular region or subarea can take action upon presence detection in that particular subarea. For example, a full illumination level may be provided in a particular subarea when presence is detected in that subarea and a half illumination level may be provided in neighboring subareas for reducing hard transitions from full illumination to darkness (i.e. no illumination). For obtaining such communication of presence information between different subareas in a space, communication infrastructures, such as I2C, UART, DALI and ZigBee, are available, as previously mentioned. However, all of these communication infrastructures require additional hardware, such as copper for wired connections and additional electronics, which results in a higher bill of material cost and increases installation complexity and costs. The inventors have realized that the wave signals used for presence detection may themselves be utilized for communicating presence information, thereby reducing the need for additional communication channels, such as those referred to above.

With the present invention, the first presence detector communicates presence information by changing a property parameter (or a characteristic) of the first wave signal if presence is detected (e.g. within the detection area of the first presence detector). Preferably, the property parameter of the first wave signal is maintained unchanged if no presence is detected. Hence, the changed property parameter of the first wave signal is an indication that presence has been detected by the first presence detector. The change in the property parameter of the first wave signal may then be detected by the second presence detector, which monitors the first wave signal (from the first detector) for changes, whereupon the second presence detector may transmit a control signal. In that way, the presence information is communicated from the first presence detector to the second presence detector. The communication of presence information allows further action to be taken, such as adjustment of illumination level, an HVAC (heating, ventilation, and air conditioning) parameter or any other desired parameter, in subareas located in the vicinity of a subarea where presence is (or has been) detected. The control signal transmitted by the second presence detector may preferably be an internal signal within the lighting system (such as an electrical signal from the second presence detector to a light source associated with the second presence detector), i.e., not a wave signal for presence detection.

It will be appreciated that the presence detection unit (or processing unit) may comprise a single component (or unit), or alternatively separate components (or units), for performing transmission of wave signals and change of a property parameter, respectively. Further, the monitoring unit may comprise a single component (or unit), or alternatively separate components (or units), for performing monitoring of a property parameter of a wave signal and transmission of the control signal, respectively.

The present invention is advantageous in that presence information can be communicated between different presence detectors without using additional communication systems, thereby reducing technical complexity as well as costs. Further, no central unit for gathering and forwarding presence information is required, as presence information can be communicated directly between the presence detectors themselves.

Detection of a change in a property parameter in a wave signal may e.g. be realized by detecting an increase or decrease of the property parameter or detecting when the property parameter exceeds or falls below a predetermined reference value.

The embodiments of the present invention described in the following may be combined with each other and any one of the first, second, third and fourth aspects of the invention.

According to an embodiment, the first wave signal (and optionally also any wave signal transmitted by the second presence detector) may be an ultrasonic signal or a radar signal. Both ultrasonic and radar techniques are based on the concept of transmitting a wave (an ultrasonic wave or a radar wave) and performing presence detection by measuring an echo of the transmitted wave from the environment.

According to an embodiment of the present invention, the step of changing the property parameter of the first wave signal may comprise changing a first property parameter to a second property parameter of the first wave signal, and the first wave signal may be transmitted with the second property parameter after the change. Hence, the first presence detector may be configured to transmit the first wave signal having the first property parameter (or value) until presence is detected, whereupon the first presence detector starts to transmit the first wave signal with the second property parameter instead. The present embodiment is advantageous in that the first presence detector may simply switch from the first property parameter to the second property parameter for communicating that presence has been detected.

Further, the method of operating the second presence detector may comprise detecting the second (or a predetermined) property parameter of the first wave signal and, preferably, transmit a control signal upon the detection of the second property parameter. The control signal allows further action to be taken, e.g. the control signal may actuate illumination (or increase heat) in the subarea associated with the second presence detector. The first property parameter may not necessarily be detected by the second presence detector: detection of the second property parameter suffices for determining if the first detector has detected presence.

According to an embodiment of the present invention, transmission of the first wave signal with the second property parameter may be performed in a communication sub-slot of the first timeslot. The first time slot may be a time slot dedicated to the first presence detector for performing presence detection. Neighboring presence detectors may preferably perform presence detection in other time slots, offset from the first time slot, for reducing interference between the wave signals transmitted by the presence detectors. According to the present embodiment, the first timeslot may comprise a communication sub-slot, whereby a part of the first time slot is dedicated to communication of presence information. Optionally, the first presence detector may, subsequent to transmitting the first wave signal with the second property parameter, return to transmitting the first wave signal with the first property parameter.

Further, the method of operating the second presence detector may comprise monitoring the property parameter of the first wave signal at least in the communication sub-slot. The second presence detector may not necessarily perform monitoring in the rest of the first time slot.

Further, transmission of the first wave signal with the first property parameter for detecting presence based on the echo of the first wave signal may be performed in a presence detection sub-slot of the first time slot, offset from, and prior to, the communication sub-slot. Hence, in the first time slot, determination of whether an object is present may be performed first (in the presence detection sub-slot) and then presence information is communicated by transmitting the first wave signal with the second property parameter (in the communication sub-slot) if presence has been determined (detected) in the presence detection sub-slot. If no presence has been detected in the presence detection sub-slot, no communication and no action may be performed in the communication sub-slot or, alternatively, the first presence detector may in that case continue to transmit the first wave signal with the first property parameter in the communication sub-slot. It will be appreciated that, even though the term "communication sub-slot" is used, communication may not necessarily take place in each communication sub-slot, but merely when presence has been detected.

Alternatively, or as a complement, according to an embodiment of the present invention, the first time slot may be repeated and transmission of the first wave signal with the second property parameter may be performed in the repeated first time slot. With the present embodiment, the first time slot may not necessarily be divided into sub-slots, as communication is instead (or as a complement) performed in the repeated (subsequent) first time slot. The first time slot may be part of a time frame comprising a number of time slots, like in a time division duplex communication system. The first presence detector may continue to perform presence detection (or monitoring of presence) by means of the first wave signal with the second property parameter or return to transmit the first wave signal with the first property parameter in yet another repeated first time slot.

According to an embodiment of the present invention, the method of operating the first presence detector may further comprise the steps of monitoring, in a second time slot offset from the first time slot, a property parameter of a second wave signal transmitted from another (e.g. neighboring) presence detector, and transmitting a control signal upon detection of a change in the monitored property parameter of the second wave signal or detection of a particular value (preferably predetermined) in the monitored property parameter. The first presence detector may thus be configured in such a way that, in addition to communicating presence information generated by itself, it also receives or detects presence information from other presence detectors. The monitoring may be performed by a monitoring unit in the first presence detector, which may be included in the same part as the presence detector or as a separate part.

According to an embodiment, the control signal (transmitted by the first presence detector) may be based on (such as representative of) the changed property parameter of the second wave signal. Similarly, the control signal transmitted by the second presence detector may be based on the changed property parameter of the first wave signal. With the present embodiment, action may be taken based upon the new property parameter. For example, different actions (affecting the environment in at least some of the subareas of the space in which the presence detectors are arranged) may be taken as a result of different property parameters (or values).

According to an embodiment, the first time slot (and optionally also the second time slot) may be repeated periodically or in accordance with a time schedule, whereby presence detection, and optionally also communication of presence information if presence has been detected, may be performed in a repetitive manner. For example, the first time slot, and preferably also the second time slot, may be provided in a time frame which is repeated. The time frame may comprise a time slot for each presence detector in a presence detector system, or at least for each presence detector in a group of neighboring presence detectors. Each presence detector may then have a dedicated time slot in each repeated time frame for performing presence detection, whereby interference between the signals transmitted by the presence detectors is reduced. Preferably, the first time slot may not overlap the second time slot.

According to an embodiment of the present invention, the property parameter of the first wave signal (and preferably also the property parameter of the second wave signal) may be at least one of a frequency, a pulse length, a number of pulses and an amplitude of the first wave signal. The wave signals may be changed (or modulated) in any appropriate way to convey presence information. Presence (detected by a presence detector) may e.g. be communicated by shifting the frequency, the pulse length, the number of pulses (e.g. in one burst) and/or the amplitude of the wave signal from one value to another. More complex techniques may also be envisaged, such as modulating the wave signal according to a specific pattern (with respect to e.g. frequency and/or amplitude) when presence has been detected.

According to an embodiment of the present invention, the method may further comprise the steps of determining an activity type performed by a detected object, selecting a property parameter (such as a property value) among a set of predetermined property parameters, based on the determined activity type, and changing the property parameter of the first wave signal to the selected property parameter. The activity type may be determined based on the echo of the first wave signal. An ultrasonic-based presence detector may not only determine the mere presence of an object, but also determine further presence information such as how much movement and at what distance (and in case of multiple presence detectors, at what angle) a movement was detected. Such presence information may be used to determine an activity type. For example, a small movement detected underneath a presence detector may be interpreted as a person working behind his/her desk, and a large movement detected in several locations over time and at a rather large distance may be interpreted as a person walking by.

The present embodiment is advantageous in that the presence information communicated between the presence detectors may comprise an indication of the activity performed by the detected object and action (such as adjustment of illumination level) may be taken based on the activity.

It will be appreciated that, in embodiments of the invention, the first and second presence detectors may be equally configured (i.e. operate according to the same principles). Accordingly, any of the embodiments described above for the first presence detector may be applied as well to the second presence detector and vice versa. For example, the method of operating the second presence detector may further comprise the steps of transmitting a second wave signal in a second time slot offset from the first time slot for detecting presence of an object based on an echo of the second wave signal, and if presence of an object is detected, changing a property parameter of the second wave signal.

According to an embodiment of the present invention, a presence detector system is provided. The presence detector system may comprise a first presence detector according to the third aspect of the present invention and a second presence detector according to the fourth aspect of the present invention. The present embodiment provides a presence detector system with at least two presence detectors able to communicate presence information at least from the first presence detector to the second presence detector.

According to an embodiment of the present invention, a lighting system is provided, which may comprise a lighting device and a presence detector according to the fourth aspect of the present invention (referred to as the second detector in the present specification). The lighting device may be configured to be controlled (or to operate) based on the control signal transmitted by the (second) presence detector. With the present embodiment, the lighting device may be controlled based on presence information received from another (such as a neighboring) presence detector. For example, if presence is detected by a neighboring presence detector, the illumination level of the lighting device may be adjusted (e.g. switched on) to half illumination level.

It is noted that the invention relates to all possible combinations of features recited in the claims. Further objectives of features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

These and other aspects of the present invention will now be described in more detail, with reference to the appended drawings showing embodiments of the invention.

All the figures are schematic, not necessarily to scale, and generally only show parts which are necessary in order to elucidate the invention, wherein other parts may be omitted or merely suggested.

DETAILED DESCRIPTION

Figure 1A:
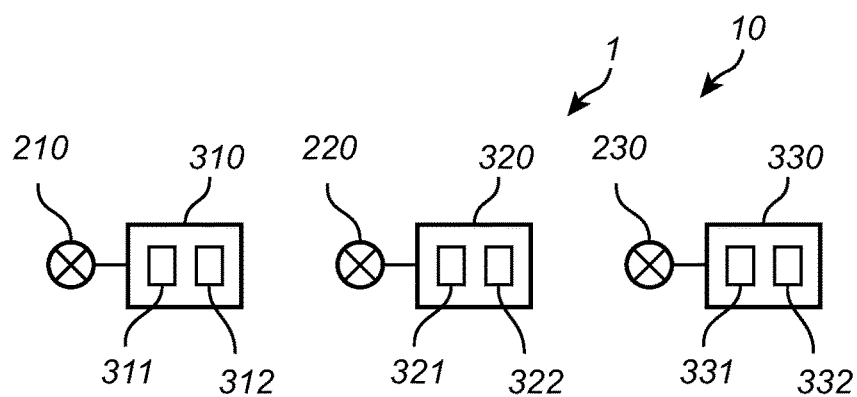
FIG. 1a schematically shows a lighting system according to an embodiment of the present invention.
Figure 1B:
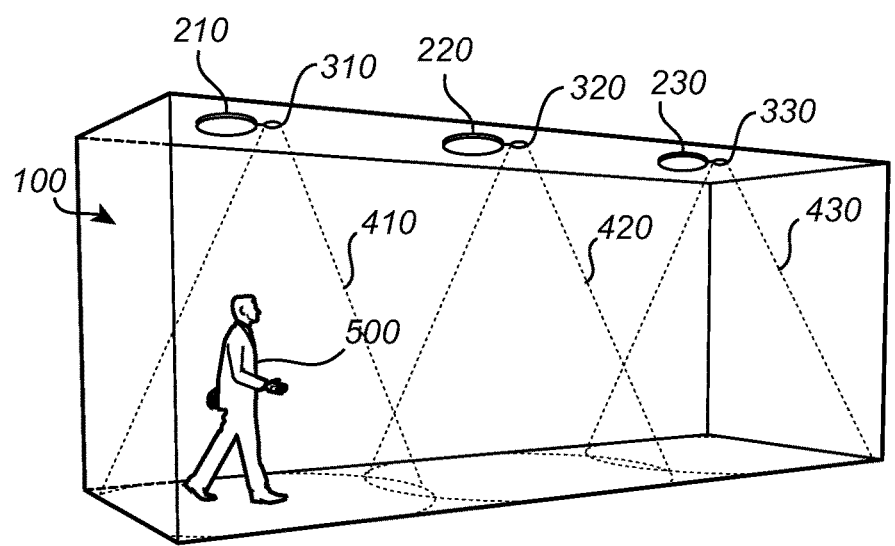
FIG. 1b shows the lighting system of FIG. 1a installed in a space.

A lighting system according to an embodiment of the present invention will be described with reference to FIGS. 1a and 1b in the following.

The lighting system 1 comprises a first lighting device 210, a second lighting device 220 and a third lighting device 230. The lighting system 1 further comprises a presence detector system 10 comprising a first presence detector 310 connected to the first lighting device 210, a second presence detector 320 connected to the second lighting device 220 and a third presence detector 330 connected to the third lighting device 230.

Each presence detector 310, 320, 330 comprises a presence detection unit 311, 321, 331 configured to perform presence detection and to communicate (transmit) presence information indicative of whether presence is detected to the other presence detectors 310, 320, 330. The presence detector unit 311 of the first presence detector 310 is configured to monitor a first subarea 410 of the space 100, the presence detector unit 321 of the second presence detector 320 is configured to monitor a second subarea 420 of the space 100 and the presence detector unit 331 of the third presence detector 330 is configured to monitor a third subarea 430 of the space 100 for presence of an object 500. The subarea 410, 420, 430 that each presence detector 310, 320, 330 monitors, preferably coincides with the area that the associated lighting device 210, 220, 230 illuminates. The monitoring of presence (or presence detection) is performed by sending out a wave signal (such as an ultrasound or radar signal), measuring the echo of the wave signal received from the environment and determine presence based on the measured echo. The presence detection units 311, 321, 331 may each comprise a transceiver for transmitting wave signals and receiving echoes from wave signals.

Each presence detector 310, 320, 330 further comprises a monitoring unit 312, 322, 332 for monitoring (and receiving) presence information communicated by the other presence detectors 310, 320, 330. The monitoring unit 312, 322, 332 may be comprised in a main presence detector part together with the presence detector unit 311, 321, 331 or as a separate part connected to the main presence detector part. The monitoring unit 312 of the first presence detector 310 is configured to transmit a control signal to the first lighting device 210, based on presence information obtained by the presence detector unit 311 of the first presence detector 310, and on presence information communicated by the other presence detectors 320, 330. The monitoring units 322, 332 of the second and third presence detectors 320, 330 are similarly configured.

Figure 2:
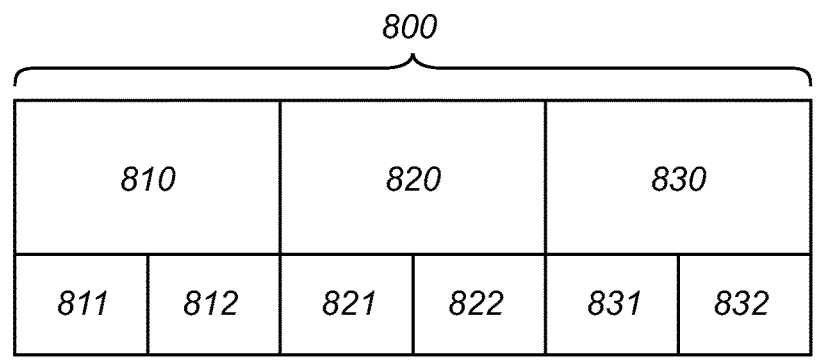
FIG. 2 shows a time frame according to an embodiment of the present invention.

For reducing interference between the wave signals transmitted by the presence detectors 310, 320, 330, a time division multiplexing technique may preferably be utilized, which will now be described with reference to FIG. 2 in particular. A time frame 800 is divided into time slots 810, 820, 830, e.g. as many time slots as there are presence detectors. However, one and the same timeslot may be used for presence detectors located sufficiently far apart from each other to ensure that they do not influence each other's measurements.

The first time slot 810 is dedicated to the first presence detector 310, the second time slot 820 is dedicated to the second presence detector 320, and the third time slot 830 is dedicated to the third presence detector 330, for performing presence detection. The time frame 800 may be repeated as long as presence detection is to be performed.

According to an embodiment, each time slot 810, 820, 830 may be divided into a presence detection sub-slot 811, 821, 831, respectively, and a subsequent communication sub-slot 812, 822, 832, respectively. In the presence detection sub-slot 811, 821, 831, the presence detector 310, 320, 330 performs presence detection (monitors its subarea for presence) and in the communication sub-slot 812, 822, 832, the presence detector 310, 320, 330 communicates if presence has been detected. Alternatively, e.g. in case the dedicated time slots are not divided into a presence detection sub-slot and a communication sub-slot, each presence detector 310, 320, 330 utilizes its subsequent time slot (in the repeated time frame) for communicating presence information. The presence detector may then continue monitoring for presence in the subsequent time slot, but with a changed property parameter, thereby communicating presence information to other presence detectors.

Figure 3:
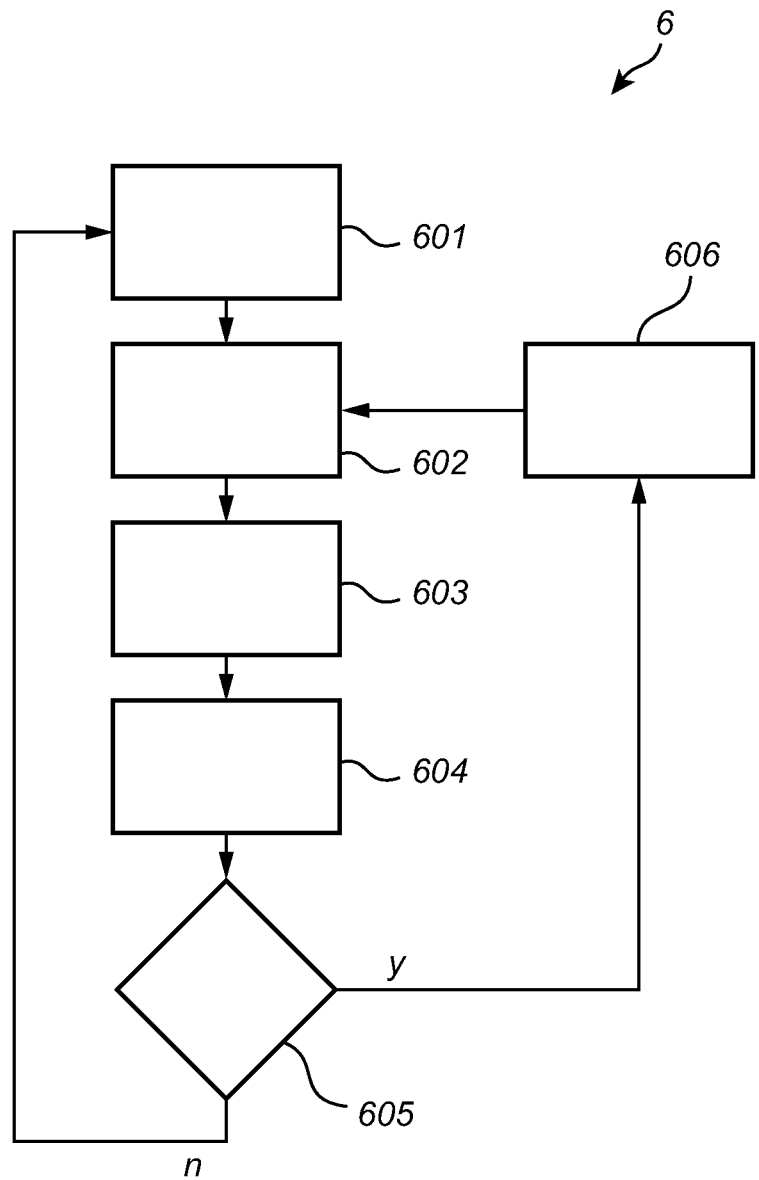
FIG. 3 shows a method of operating a presence detector according to an embodiment of the present invention.
Figure 4:
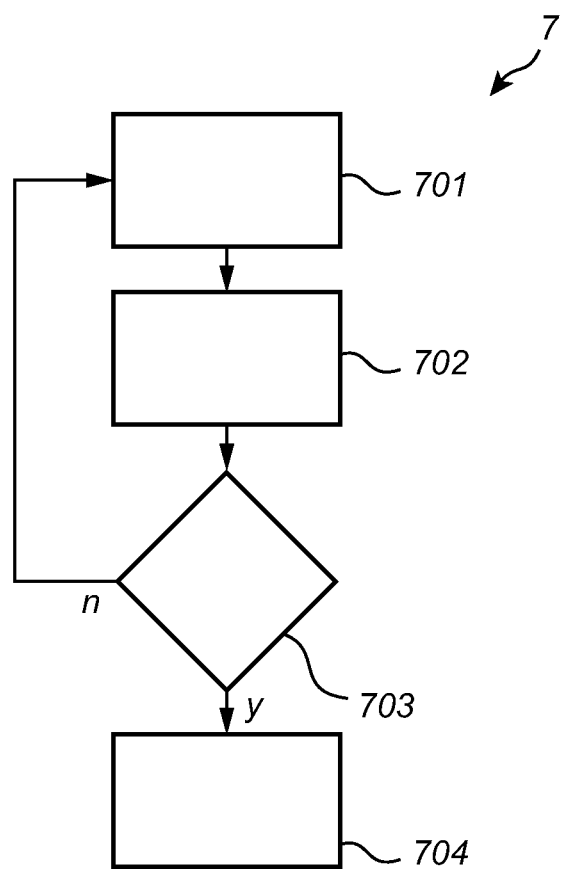
FIG. 4 shows a method of operating a presence detector according to another embodiment of the present invention.

The monitoring for presence (the performing of presence detection) and communication of presence information between the presence detectors 310, 320, and 330 will be described in more detail in the following. FIGS. 3 and 4 show schematic illustrations of methods of operating the presence detectors 310, 320, and 330. It will be appreciated that, even though the methods are described with respect to the first presence detector 310 in the following, the methods may equally be applied to any one of the second and third presence detectors 320, 330, with the difference that the second presence detector 320 performs presence detection and communication of presence information in the second time slot 820 and the third presence detector 330 performs presence detection and communication of presence information in the third time slot 830.

First, a method 6 of operating a presence detection unit of a presence detector will be described with reference to FIG. 3. The presence detection unit 311 of the first presence detector 310 sets a first property parameter for a first wave signal, which in the present example is a frequency A (e.g. 40 kHz), at step 601 and awaits the first time slot 810 at step 602. When the first time slot 810 comes, the presence detection unit 311 transmits the first wave signal with the first property parameter, i.e. at frequency A, towards its subarea 401. The first wave signal is reflected by the environment (i.e. the walls, floor and possibly a moving object, such as a person, present in the subarea 401) and a portion of the reflected first wave signal is then received (as an echo) at the presence detection unit 311. At step 604, the presence detection unit 311 measures the received echo of the first wave signal and determines, based on the measured echo, if an object 500 is present in the subarea 410. The method of presence detection may e.g. be effected by Doppler shift measurements, time-of-flight measurements or MTI processing. If no presence is detected (represented by n at decision point 605 in FIG. 6), the frequency (or property parameter) of the first wave signal is maintained at frequency A (the first property parameter) at step 601, which is repeated together with the subsequent steps 602-605. If presence of an object 500 is detected (represented by y at decision point 605 in FIG. 6), the presence detection unit 311 changes the property parameter of the first wave signal by setting a second property parameter for the first wave signal, which in the present example is a frequency B (e.g. 40.5 kHz), at step 606.

Optionally, the presence detection unit 311 may determine an activity type performed by the object 500, based on the echo of the first wave signal, and then select a property parameter among a set of predefined property parameters (such as selecting a frequency among a set of different frequencies) and set the selected property parameter for the first wave signal at step 606. For example, 40.5 kHz may represent walking activity, 39.5 kHz standing activity and 39.0 kHz concentrated work activity (such as typing or reading). After the new (second) property parameter is set, steps 602-605 are repeated, which means that the presence detection unit 311 performs presence detection (monitors presence) by transmitting the first wave signal with the second property parameter (frequency B) in the repeated first time slot 810.

According to an alternative embodiment, the presence detection unit 311 may await, at step 602, a presence detection sub-slot 811 of the first time slot 810 and perform steps 603-605 in the presence detection sub-slot. If presence is detected, the presence detection unit 311 sets the second property parameter (frequency B) and awaits a communication sub-slot 812 of the first time slot 810, which may follow directly upon the presence detection sub-slot 811. When the communication sub-slot 812 comes, the presence detection unit 311 transmits the first wave signal with the second property parameter (frequency B). At this point, no measuring of the echo of the first wave signal with the second property parameter is required, as the purpose is merely to communicate that presence is detected. When the first time slot 810 is repeated, the presence detection unit 311 may return to transmit the first wave signal with the first property parameter (frequency A) and repeat the above described steps. If no presence is detected in the presence detection sub-slot 811, the property parameter of the first wave signal may remain unchanged, and, optionally, no wave signal may be transmitted in the communication sub-slot 812. Alternatively, (if no presence is detected) the first wave signal may be transmitted with the first property parameter (frequency A) in the communication sub-slot 812.

If presence of an object is detected in the subarea 410, the presence detection unit 311 may transmit a control signal to the first lighting device 210 indicating that presence is detected. The first lighting device 210 may then be controlled, based on the control signal, and e.g. switch on to full illumination level.

With reference to FIG. 4, a method 7 of operating a monitoring unit of a presence detector will be described in the following. The monitoring unit 312 of the first presence detector 310 monitors a property parameter (such as the frequency) of a wave signal from a neighboring presence detector 320, 330 in a time slot of the neighboring presence detector 320, 330, i.e. in the second or third time slot 820, 830, at step 701. The monitoring unit 312 then determines the dominant property parameter (in the present example, the dominant frequency) of the monitored wave signal at step 702. If no change (or shift) in the property parameter is detected (represented by n at decision point 703), the monitoring unit 312 awaits the next time slot of a neighboring presence detector and repeats steps 701-703. If a change is detected (represented by y at decision point 703) in the property parameter of the monitored wave signal, such as a shift from the dominant frequency A to the dominant frequency B, the monitoring unit 312 transmits a control signal, e.g. to the first lighting device 210, indicating that presence has been detected in a neighboring subarea 420, 430. The lighting device 210 may then be controlled, based on the control signal from the monitoring unit 312, and e.g. switch on to half illumination level.

In case each time slot is divided into a presence detection sub-slot and a communication sub-slot, monitoring of the property parameter of wave signals from the neighboring presence detectors only has to take place in the communication sub-slots of the neighboring presence detectors' time slots, which may be advantageous for saving power.

According to an embodiment, the control signal transmitted by the monitoring unit 312 may represent the detected property parameter and thereby also represent the type of activity performed by the object 500 detected by the neighboring presence detector. The lighting device 220 may then be controlled according to the activity type.

The person skilled in the art will realize that the present invention by no means is limited to the preferred embodiments described above. On the contrary, many modifications and variations are possible within the scope of the appended claims. For example, the presence detector system may be connected to a type of system other than a lighting system, such as an HVAC system.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first presence detector configured to detect presence of an object in a subarea of a space, the first presence detector comprising:
   a transmitter configured to transmit a first wave signal in a first time slot with a first property parameter; and
   a monitoring unit configured to detect presence of an object based on an echo of the first wave signal, said presence detector configured to set the first property parameter of the first wave signal and to change the first property parameter if presence is detected,
   wherein the monitoring unit is configured to change the first property parameter to a second property parameter of the first wave signal after presence is detected and the transmitter configured to transmit the first wave signal with the second property parameter after the change for detection by a second presence detector.

2. The first presence detector as defined in claim 1, wherein transmission of the first wave signal with the second property parameter is performed in a communication sub-slot of the first timeslot.

3. The first presence detector as defined in claim 2, wherein the first timeslot is repeated and transmission of the first wave signal with the second property parameter is performed in the repeated first time slot.

4. The first presence detector as defined in claim 3, wherein the first time slot is repeated periodically or in accordance with a time schedule.

5. The first presence detector as defined in claim 1, wherein the property parameter of the first wave signal is at least one of a frequency, a pulse length, a number of pulses and an amplitude of the first wave signal.

6. The first presence detector as defined in claim 1, further comprising the steps of: the monitoring unit configured to determine an activity type performed by the object, select a property parameter among a set of predetermined property parameters, based on the determined activity type, and changing the property parameter of the first wave signal to the selected property parameter.

7. A presence detector configured to detect presence of an object in a subarea of a space, the presence detector comprising:
 a transmitter configured to transmit a first wave signal in a first time slot with a first property parameter, and
 a monitoring unit configured to detect presence of an object based on an echo of the first wave signal, said presence detector configured to set the first property parameter of the first wave signal and to change the first property parameter if presence is detected,
 wherein transmission of the first wave signal with the first property parameter is performed in a presence detection sub-slot of the first time slot, offset from, and prior to, a communication sub-slot.

8. A method of operating a presence detector, the method comprising the steps of:
 monitoring, in a first time slot, a property parameter of a first wave signal transmitted from another presence detector;
 detecting a second property parameter in the monitored property parameter, wherein the property parameter has been changed from a first property parameter to the second property parameter by the another presence detector upon detection presence of the object in another subarea of the space; and
  transmitting a control signal upon detection of the change in the monitored property parameter of the first wave signal.

9. A presence detector, arranged for detecting presence of an object in a subarea of a space, the presence detector comprising:
 a monitoring unit configured to monitor, in a first time slot, a property parameter of a first wave signal transmitted from a first presence detector configured for detecting presence of the object in another subarea of the space,
 wherein the monitoring unit is configured to detect a change in the monitored property parameter of the first wave signal from a first property parameter to a second property parameter, and wherein the presence detector is configured to transmit a control signal upon detection of the change in the monitored property parameter of the first wave signal.

10. The presence detector according to claim 9 comprising a presence detection unit configured to transmit a second wave signal in a second time slot for detecting presence of the object based on an echo of the second wave signal, and, if presence of an object is detected, change a property parameter of the second wave signal.

11. A lighting system comprising:
 a lighting device; and
 a presence detector as defined in claim 9,
 wherein the lighting device is configured to be controlled based on the control signal transmitted by the presence detector.

12. A method of operating a system of presence detectors, arranged for detecting presence of an object in a subarea of a space, the method comprising the steps of:
 transmitting by a first presence detector a first wave signal in a first time slot with a first property parameter;
 detecting by the first presence detector presence of the object based on the echo of the first wave signal;
 changing the first property parameter to a second property parameter if presence is detected;
 transmitting the first wave signal with the second property parameter after the change for detection by a second presence detector;
 monitoring, by the second presence detector, in the first time slot, whether the first property parameter of the first wave signal transmitted from the first presence detector has been changed to the second property parameter, arranged for detecting presence of the object in another subarea of the space; and
 transmitting a control signal upon detection of the change in the monitored property parameter of the first wave signal.

* * * * *